US008566438B2

(12) United States Patent
Wisniewski et al.

(10) Patent No.: US 8,566,438 B2
(45) Date of Patent: Oct. 22, 2013

(54) COMMUNICATION TAGGING

(75) Inventors: Robert W. Wisniewski, Yorktown Heights, NY (US); Mary Yvonne Lanzerotti Wisniewski, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 3235 days.

(21) Appl. No.: 10/724,845

(22) Filed: Dec. 1, 2003

(65) Prior Publication Data

US 2005/0120108 A1    Jun. 2, 2005

(51) Int. Cl.
*G06F 15/173* (2006.01)
*G06F 15/16* (2006.01)

(52) U.S. Cl.
USPC .......................................... 709/224; 709/207

(58) Field of Classification Search
None
See application file for complete search history.

(56) References Cited

U.S. PATENT DOCUMENTS

| 6,501,834 | B1 | 12/2002 | Milewski et al. ........... 379/93.24 |
| 6,532,489 | B1 | 3/2003 | Merchant ........................ 709/206 |
| 6,601,190 | B1 | 7/2003 | Meyer et al. .................... 714/37 |
| 2002/0095454 | A1* | 7/2002 | Reed et al. ..................... 709/201 |
| 2004/0030741 | A1* | 2/2004 | Wolton et al. ................. 709/202 |

\* cited by examiner

*Primary Examiner* — John B. Walsh
(74) *Attorney, Agent, or Firm* — Harrington & Smith (57) ABSTRACT

A communication system including a database adapted to store communication tag information; and a database agent. The database agent is adapted to determine if a communication has a task tag. The database agent is adapted to transfer predetermined communication tag information of the task tag of the communication to the database. The database agent is adapted to automatically send a communication based upon information stored in the predetermined communication tag information.

1 Claim, 8 Drawing Sheets

COMMUNICATION TAGGING

TECHNICAL FIELD

This invention relates to a method of tagging communications to provide automatic database capabilities, thus facilitating the management of project deliverables and tasks. The database capabilities can include activation, tracking, reporting, evaluation, and disposition of the project tasks.

BACKGROUND

Communication, whether email, instant message, or phone, forms the basis that individuals, team leaders, and managers use to coordinate projects and track progress of their projects. Moving from the communication to generating progress reports is a manual process. While project management packages such as Microsoft Office exist, they are not sufficiently integrated into the communication infrastructure. Thus, the data required by such programs needs to be entered manually based on the communication that occurs between the project participants. Further, there is no ability to verify that the task is entered correctly.

It is important in the workplace to be able to track both individual and team progress. Tracking and reporting deliverables and tasks decided on via communication among individuals is critical to teams and individuals who need to summarize and present their work periodically to others, including 1) team leaders and project leaders who need to understand and be able to act and react to changes in project status, and 2) project managers who need to decide where to allocate resources. Existing in the marketplace today are 1) simple calendar programs that provide individuals with the ability to add action items such as calendar entries and to generate reminders for action items and 2) Programs like Microsoft Project, which can provide project managers with the status of a project. Neither of these existing programs, nor other such programs, are well integrated into common forms of communication in the workplace.

Today, many methods of communication exist in the workplace. These methods include regular mail, telephone calls, and electronic communications which can take the form of electronic mail messages and instant messages. However, the integration of these communication methods into the ability to aid in task tracking is minimal. Some capabilities, such as automatic calendar updates upon invitation acceptance, exist in programs such as Lotus Notes, but for the most part, tracking of progress on individual, team, and project tasks, whether human or computer-generated or accomplished, is done outside the scope of the communication itself.

Many of the functions described here and in the examples below occur in conventional systems in ad hoc and manual ways. There is a desire to coordinate these functions with the use of an automatic agent that understands tagged communications to significantly facilitate the effectiveness of individuals, team leaders, and managers and, thus, increase overall project performance.

SUMMARY OF THE PREFERRED EMBODIMENTS

The foregoing and other problems are overcome, and other advantages are realized, in accordance with the presently preferred embodiments of these teachings.

In accordance with one aspect of the present invention, a communication system is provided including a database adapted to store communication tag information; and a database agent. The database agent is adapted to determine if a communication has a task tag. The database agent is adapted to transfer predetermined communication tag information of the task tag of the communication to the database. The database agent is adapted to automatically send a communication based upon information stored in the predetermined communication tag information.

In accordance with one method of the present invention, a method for automatically tracking progress of a task on a computer network consisting of one or more users on a plurality of computer systems, the method comprising the steps of tagging a communication to be delivered between the computer systems over the network to form a tagged communication; and acting on the tagged communication automatically by a database agent.

In accordance with another aspect of the present invention, a system for tracking tasks is provided comprising a communication system adapted to attach a task tag to a communication; and a tracking system separate from a communication sending computer and a communication receiving computer. The tracking system is adapted to automatically enter predetermined information of the task tag of the communication into a database.

In accordance with another aspect of the present invention, a method of tracking tasks is provided comprising sending a communication; attaching a task tag to the communication; recording, by an automatic database agent, at least a portion of data in the task tag into a database; and automatically sending a communication by the automatic database agent based, at least partially, on the data in the task tag.

In accordance with another aspect of the present invention, a program storage device readable by a machine, tangibly embodied in a program of instructions executable by the machine to perform method steps for tracking tasks is provided, the method comprising steps of searching a first communication to determine if the first communication has a task tag, the task tag comprising a task topic and a task progress; and automatically sending a second communication by an automated database agent based upon data in the task tag.

In accordance with another aspect of the present invention, a program storage device readable by a machine, tangibly embodied in a program of instructions executable by the machine to perform method steps for tracking tasks is provided, the method comprising steps of creating a communication; and attaching a task tag to the communication comprising a task topic and a task progress.

It is an aspect of this invention to establish a method for tagging communications. It is another aspect of this invention to track task progress at the individual, team, and project level. It is another aspect of this invention to report on task progress at the individual, team, and project level. It is another aspect of this invention to allow automatic database agents to activate task communication at the individual, team, and project level. It is another aspect of this invention to allow and track the negotiation of task properties, such as time to task completion and task name, among the participants in the task and the interaction of these tasks with other related tasks. It is another aspect of this invention to allow and track the merging of tasks as decided by participants in the task. It is another aspect of this invention to allow and track the division of tasks into multiple tasks as decided by participants in the task. It is another aspect of this invention to allow the ability to monitor task deadline and proactively send communication to participants in the task.

This invention allows for the addition of an optional tag to electronic communications that facilitates collaboration among individuals, teams, managers, and computer systems.

For example, in electronic mail (email) communications, Lotus Notes currently allows one to tag electronic mail as a calendar invitation. An additional automatic database agent is also described to process the tagged email. The agent, via the aforementioned tags, creates entries in the database and takes actions as required by the entries. These actions include sending an evaluation email to an individual or collaborator upon expected completion of a task and then incorporating that evaluation back into the database. Other actions include collating completed tasks, initiating an evaluation email, generating reports, allowing negotiating among the collaborators of the task deliverables such as time to task completion, allowing merging of project data if one or more tasks are merged into a single task, allowing division of project data if a task is split into one or more tasks, and the ability to monitor the interactions of the collaborators and proactively request task status. In addition to communications among humans, this invention allows tagged communications to be sent to computer systems to obtain information such as computer usage at a remote site, manufacturing yield, customer purchasing patterns, and any data pertinent to a given project stored remotely on a computer system.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION OF THE PREFERRED EMBODIMENTS

Figure 1:
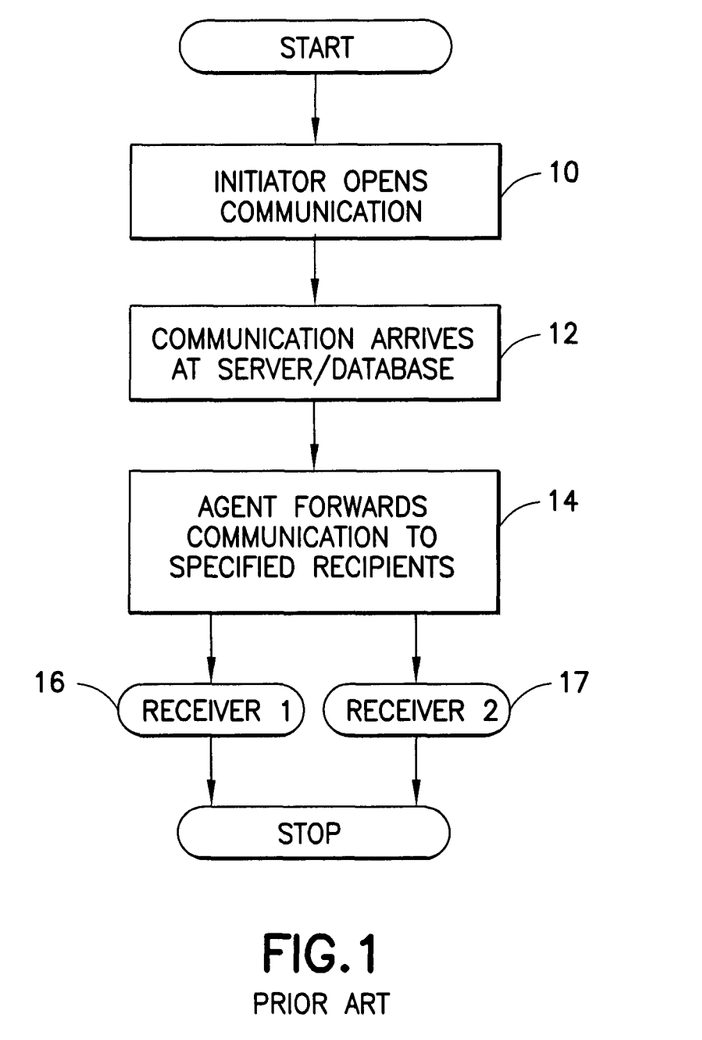
FIG. 1 is a flow chart of steps used in the prior art for communication.

Communication among participants in a project is typically initiated by one of the participants (an Initiator), who directs the communication to one or more remaining participants (a receiver). FIG. 1 shows an example of prior art showing communication among participants. When an Initiator sends communication as illustrated by block 10 there is a server through which that communication proceeds as indicated by block 12. Depending on the communication type (email, phone, instant message) there may be multiple servers between the Initiator and the receiver, and they can be at different places in the communication path. When a server receives the communication initiation it either sends it to a server closer to the end receiver(s) 16, 17, or sends it directly to the end receiver(s) 16, 17, such that the server(s) act as agent(s) to forward the communication to the specified receivers or recipients as indicated by block 14.

Figure 2:
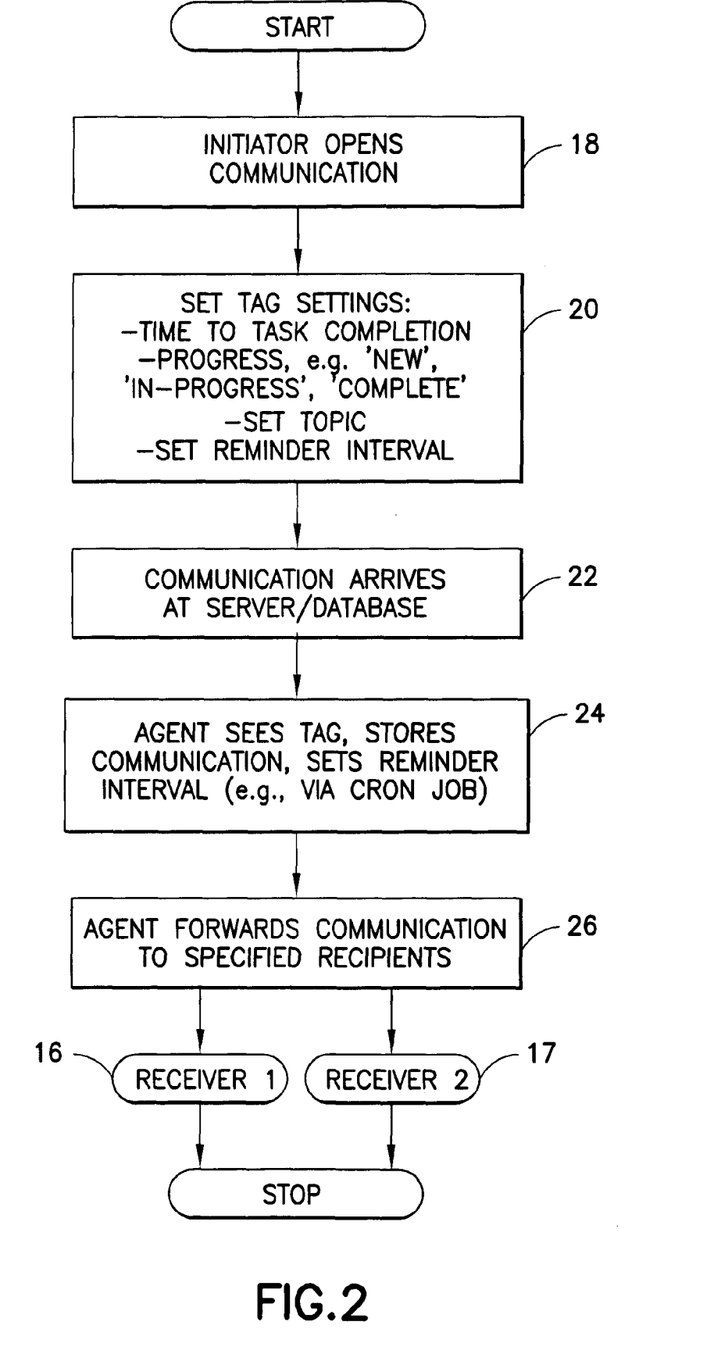
FIG. 2 is a flow chart showing steps used comprising features of the present invention.

Referring now to FIG. 2, for the method provided by the present invention, FIG. 2 shows that when an Initiator opens a communication, as indicated by block 18, there are several optional tag properties that may be set. While we describe a particular set of tags here for the communication initiation, and later for other aspects of the invention, it is within the spirit of the invention if additional tags are used. Though the invention is not limited to the following described implementation, this implementation demonstrates the potential advantages of using the invention over other mechanisms.

Figure 3:
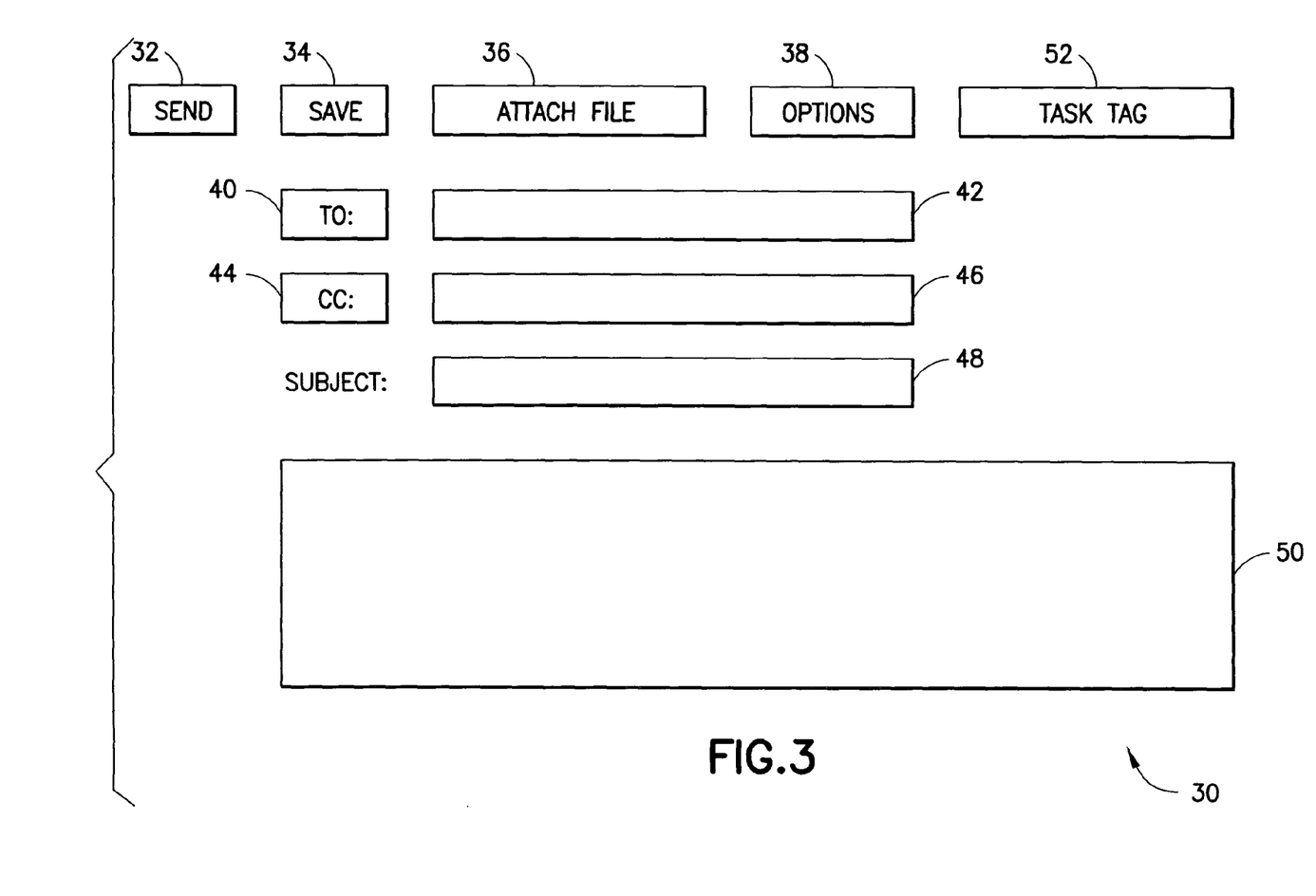
FIG. 3 is a diagram of a computer generated window display for composing and sending an email.

Referring also to FIG. 3, there is shown an example of a display on a computer screen. More specifically, the display 30 is a entry window for composing and sending an email. Other types of window displays for composing and sending emails are known in the art, and the present invention could be incorporated in such other email communication programs. The present invention could also be incorporated into other electronic communication types, such as. instant messaging (IM). In the embodiment shown in FIG. 3, the window display includes conventional items such as a Send icon 32, a Save icon 34, an Attach File icon 36, an Options icon 38, a To icon 40, a To entry field 42, a CC icon 44, a CC entry field 46, a Subject field 48, and a message field 50. The display window 30 could comprise additional or alternative fields or icons. The window 30 also comprises a Task Tag icon 52. When the user selects the Task Tag icon 52, another entry window 54, shown in FIG. 4, pops up.

Figure 4:
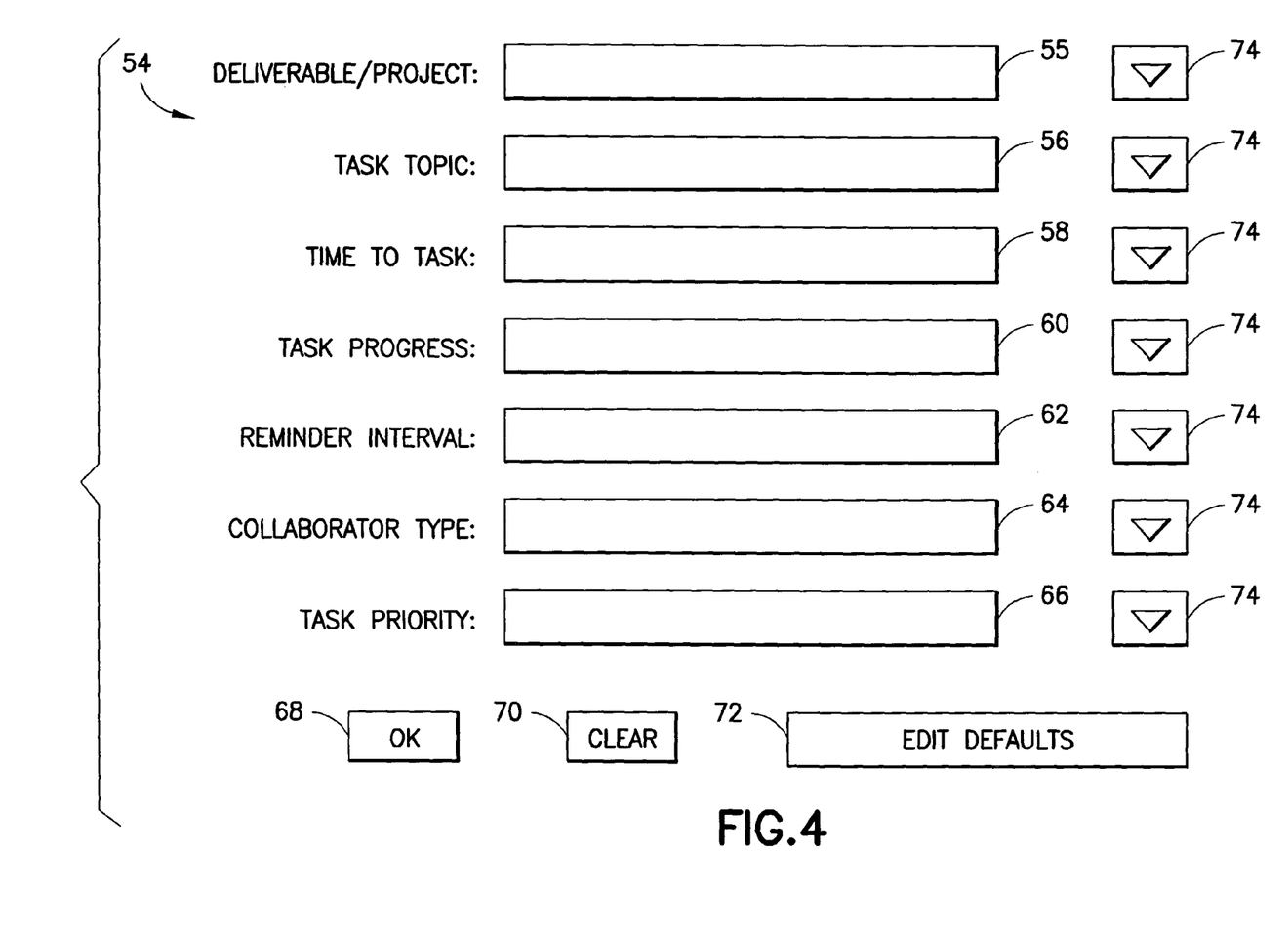
FIG. 4 is a diagram of a computer generated window display for entering task tag information into an email.

The task tag entry window 54 generally comprises a deliverable or project field 55, a task topic field 56, a time to task field 58, a task progress field 60, a reminder interval field 62, a collaborator type field 64, a task priority field 66, an OK icon 68, a Clear icon 70, an Edit Defaults icon 72, and drop-down field selection icons 74. The user can enter tag information into the fields 55-66 or select tag information to be entered into the fields by use of the drop-down menus when icons 74 are used. The one or more of the fields 55-66 could have default information automatically filled in. The default values can be changed by use of the Edit Defaults icon 72. After the information is entered into the fields 56-66, the user can select the OK icon 68 to return to the window 30 shown in FIG. 3. The subject field 48 could be automatically filled in with the information entered in the task topic field 56. FIG. 4 merely shows an example of a task tag entry field. Other designs and additional or alternative entry fields could be provided. One or more of the fields could have a limited entry feature, such as limiting the collaborator type to a single type or limiting the task topic to predefined task topics from the drop-down menu.

The task topics for the task topic field 56 are preferably subcategories or subprojects of the deliverable or project in the project field 55. The project field 55 could be automatically filled, such as when a user is only working on one project. The task topic field 56 could be automatically filed, such as when a user is only working on one task of a project. The user can enter a deliverable or project in the project filed 55 or select the project from a drop down list. For example, the project could be delivering a product to a customer and the task topics could comprise subprojects such as design of the product, bidding from subcontractors to deliver goods to make the product, assembly of the product, various quality control checks of the product, and delivery of the product to the customer. This is only an example. A deliverable or project could comprise hundreds of task topics for that project. Tracking of the deliverable or project could be monitored by tracking the task topics.

In the embodiment shown in FIG. 2, the choices available for the tag properties or tag setting are set by the Initiator as indicated by block 20. This can be done when the user creates an email and uses the Task Tag icon as described above. The task tag properties or settings can include:
  task topic;
  time to task completion;
  task progress;
  reminder interval;
  collaborator type; and
  task priority.

The tag properties or setting could include less, or additional, or alternative properties or setting. The task topic identified the task or project. This is used for correlating the email with other information or emails related to the same task topic. The time to task completion can be a specific date or can be a relative date of when a task of the task topic is expected to be completed. The task progress setting can include progress identifiers for the progress of the task of the task topic. For example, choices for the task progress could include 'previous', 'new', 'in-progress', 'complete', 'other', 'merge', 'separate'. This could be provided through a pull-down menu. In the collaborator type setting, the Initiator can identify himself or herself according to a collaborator type. The collaborator type can include, for example, choices such as 'individual', 'collaborator', 'team leader', 'manager', 'senior manager', 'vice-president', 'CEO', 'CIO', 'contractor'. This could be provided through a pull-down menu. The task priority can be used to prioritize the task of the task topic relative to other tasks. For example, the task priority setting could include, choices such as 'low priority', 'high priority', 'urgent', 'ASAP', 'performance review'. This could be provided through a pull-down menu.

Figure 5:
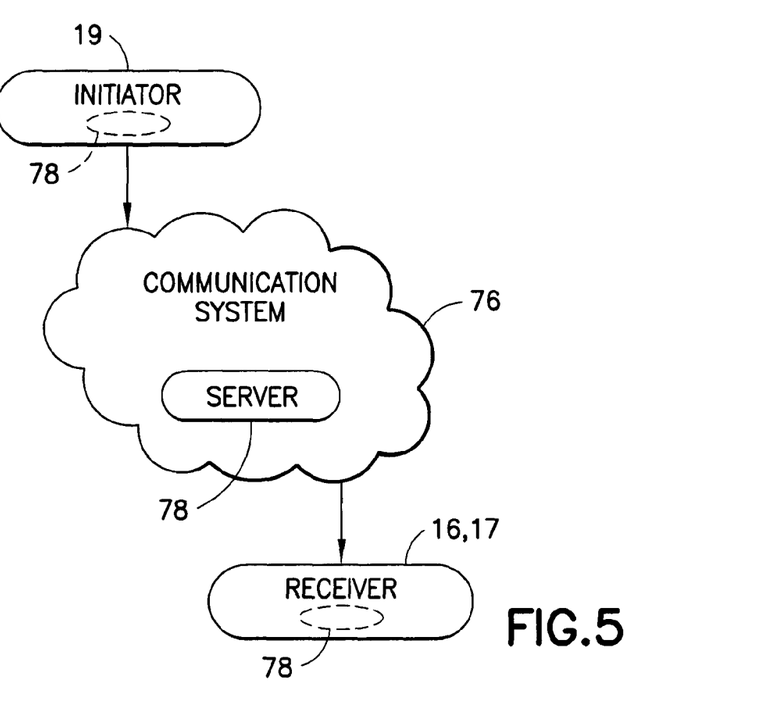
FIG. 5 is a diagram of a communication system coupling an Initiator to a receiver.
Figure 6:
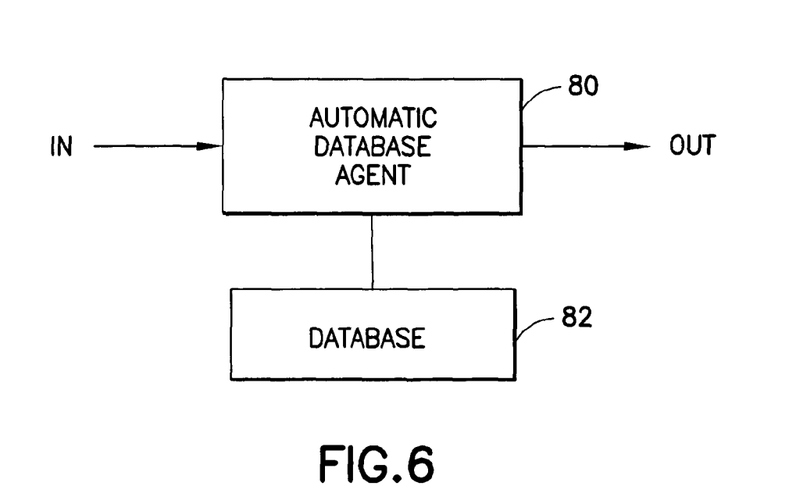
FIG. 6 is a diagram of an automatic database agent and a database incorporating features of the present invention.

As seen with reference to FIG. 5, the Initiator 19 is able to communicate with the receiver(s) 16, 17 by a communication system 76. The communication system 76, for the email embodiment being described, could be any suitable type of email communication system including an intranet system and/or an Internet system. The communication system 76 preferably comprises a server 78. The server 78 could alternatively be located at the Initiator 19, or at the receiver 16, 17, or at another remote location. Referring also to FIG. 6, the server includes an automatic database agent 80 and a database 82. The computers of the receiver and Initiator could comprise their own database agent 80 and database 82. The database agent 80 is adapted to determine if an email sent from the Initiator to the receiver(s) 16, 17 comprise a task tag. If the email has a task tag, the database agent is able to store at least a portion of the information of the task tag into the database 82.

Referring back to FIG. 2, the communication arrives at the server/database 78, as indicated by block 22, where the automatic database agent 80 sees the tag and its properties, stores the entire communication or at least portions of the information in the tag, and can adjust the reminder interval as indicated by block 24. The agent 80 stores this communication by the task topic in the tag of the communication, so that future messages with the same task topic may be associated with this task. As illustrated by block 26, the agent 80 forwards the communication to the specified recipients, such as Receiver 1 16 and Receiver 2 17. The database agent 80 is adapted to automatic send reminder communications, such as by email for example, to some or all individuals associated with the task topic at time intervals set by the reminder interval.

Figure 7:
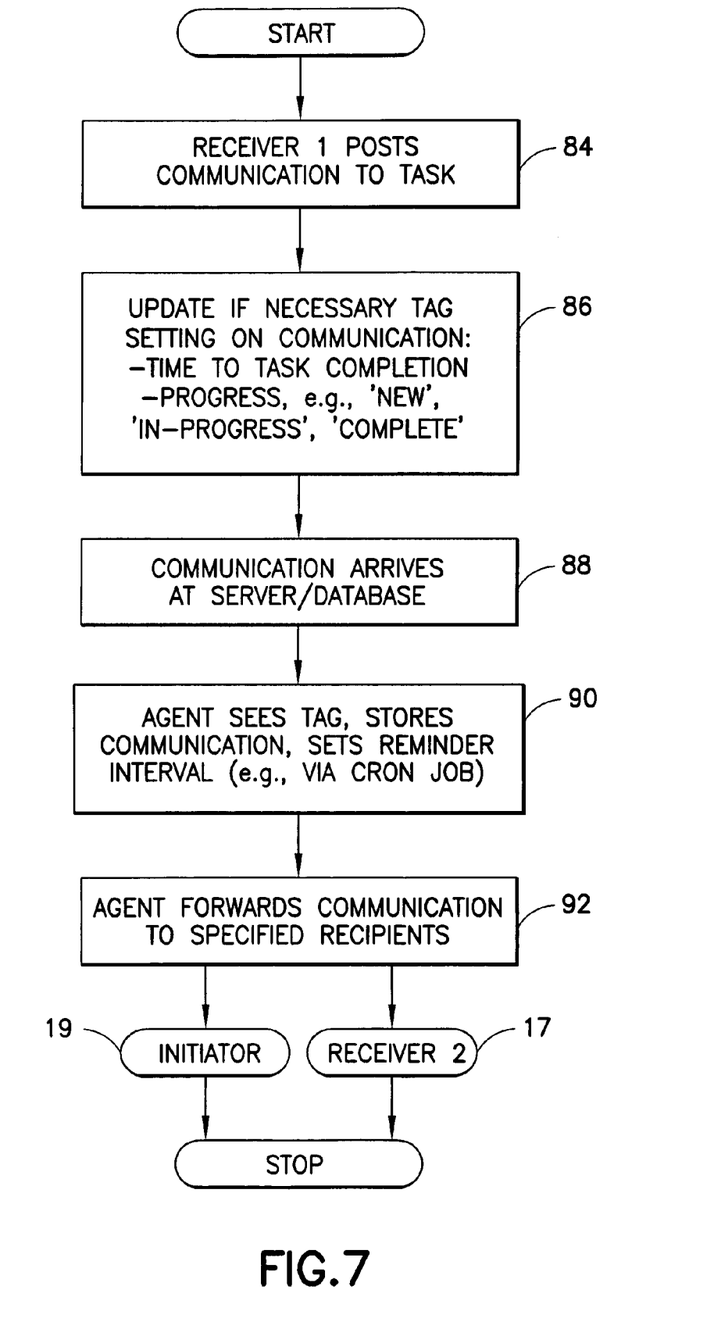
FIG. 7 is a flow chart of another feature of the present invention.

Referring now also to FIG. 7, a method for automatic task updating via communication tagging will now be described. When responding or sending a follow-up communication, there is an opportunity in the exchange of communications among the participates to update the tag properties (i.e., negotiation). When the communication arrives at the server/database as indicated by block 88, as indicated by block 90 the agent 80 sees the tag, stores the communication, and sets the value of the reminder interval. The agent forwards this communication to specified recipients, shown for example as Initiator and Receiver 2 as indicated by block 92.

In FIG. 7, one of the Receivers, Receiver 1, is shown responding to the initial communication from the Initiator 19 with a follow-up or reply communication. Receiver 1 posts a new communication as indicated by block 84. Receiver 1, as indicated by block 86, can update if necessary the tag settings on the communication. The tag settings include and are not limited to the following: 1. task progress, that can be set with settings that include 'previous', 'new', 'in progress', 'complete', 'other', 'merge', 'separate'. 2. time to task completion, 3. task topic, 4. collaborator type, that can be set with settings that include 'individual', 'collaborator', 'team leader', 'manager', 'senior manager', 'vice-president', 'CEO', 'contractor'. An important aspect of task updating that makes implementing the database agent tractable, is that during an update communication the tag associated with the initial communication can be automatically filled in (or chosen from a set of them). Providing the tag with the communication provides a mechanism by which the database agent 80 can associate communications with a given task. The initial communication can be stored on the server associated with the receiver (who is now responding) or on the computer of the receiver. With this type of embodiment, it is possible to provide the tag of the initial communication to the receiver when the receiver is creating the follow-up or reply communication.

In a preferred method, when a task is first opened, the user sets task progress to 'new'; the time to task completion is set to a specified time, the 'task topic' is entered, the 'reminder interval' is set, and the collaborator type is indicated from among the choices provided. The agent 80 can identify this communication according to the 'task topic'. The agent 80 can then file the communication and all subsequent communications with the same 'task topic' in the same location in the database 82. If the user is opening a task that is associated with a previously-closed (that is, 'complete') task, the user sets the task progress tag to 'previous'. At this point, a pull-down menu can appear with a list of complete tasks, and the user can select the appropriate task topic from the menu. The communication associated with this task is filed by the database agent 80 in the database 82 with other communications identified with the same task topic (the same information in the task topic field 56). In one type of alternate embodiment, the email communication system could be configured to automatically open the task tag entry window 54 when the user starts to create an email or create an email to a person in the same company. This automatic pop-up of the task tag entry window 54 could insure that entry of data into the task tag entry window 54 is more likely to. occur and, thus, be attached to emails.

Recipients can respond to communications received. To open a response communication to an existing initial communication such as the 'new' one described above, the user opens a task and sets the task progress to 'in progress'. At this point, the task topic bar can become a selectable list of all database tasks associated with this individual. As described above, the database can store each communication according to the names of the individuals listed in the communication. The user can selects the appropriate 'task topic' from the list provided from the database search. A list of sub-tasks for the 'in progress' task then appears in the task bar. The list of sub-tasks associated with each 'in progress' task includes but is not limited to the following: 1. Constraint; 2. Dependency;

3. Reject; 4. Reassign; 5. Meeting; 6. Other. In a preferred embodiment, a recipient who has a higher priority compared with the individual who opened the new task (for example, a manager compared with an employee) can change the task priority to a different option with the pull-down menu; negotiation with the employee is therefore permitted. Similarly, the task duration can be adjusted by a recipient who has a higher priority compared with the individual who opened the new task.

If the user selects sub-task 'constraint', a window can appear in which the user can write a brief description of a new constraint that has appeared in the task.

If the user selects sub-task 'dependency' a window can appear allowing the user to indicate the item or person the user is waiting dependent on in order to make progress. If the user wishes to indicate that a person is impeding progress the user can input the identity (for example, email address) of the appropriate person, at which point that person can be automatically contacted by the database agent 80.

If the user selects sub-task 'reject', the communication can be sent back to the Initiator indicating that the user has rejected the assigned task.

If the user selects sub-task 'reassign', a window can appear in which the user can optionally indicate the identity of the person to whom the user suggests the task be reassigned (e.g., email address), and the communication can be sent to the Initiator indicating that the user recommends that the task be reassigned.

If the user selects sub-task 'meeting', a window can appear in which the user can optionally suggest a date, time, and place for a meeting to discuss the subject identified in the 'task topic', and a communication can be sent by the database agent to all individuals associated with the task.

If the user selects sub-task 'other', a window can appear in which the user can optionally write a brief description of the category, and the database agent can forward this communication to all individuals associated with this task.

Figure 8:
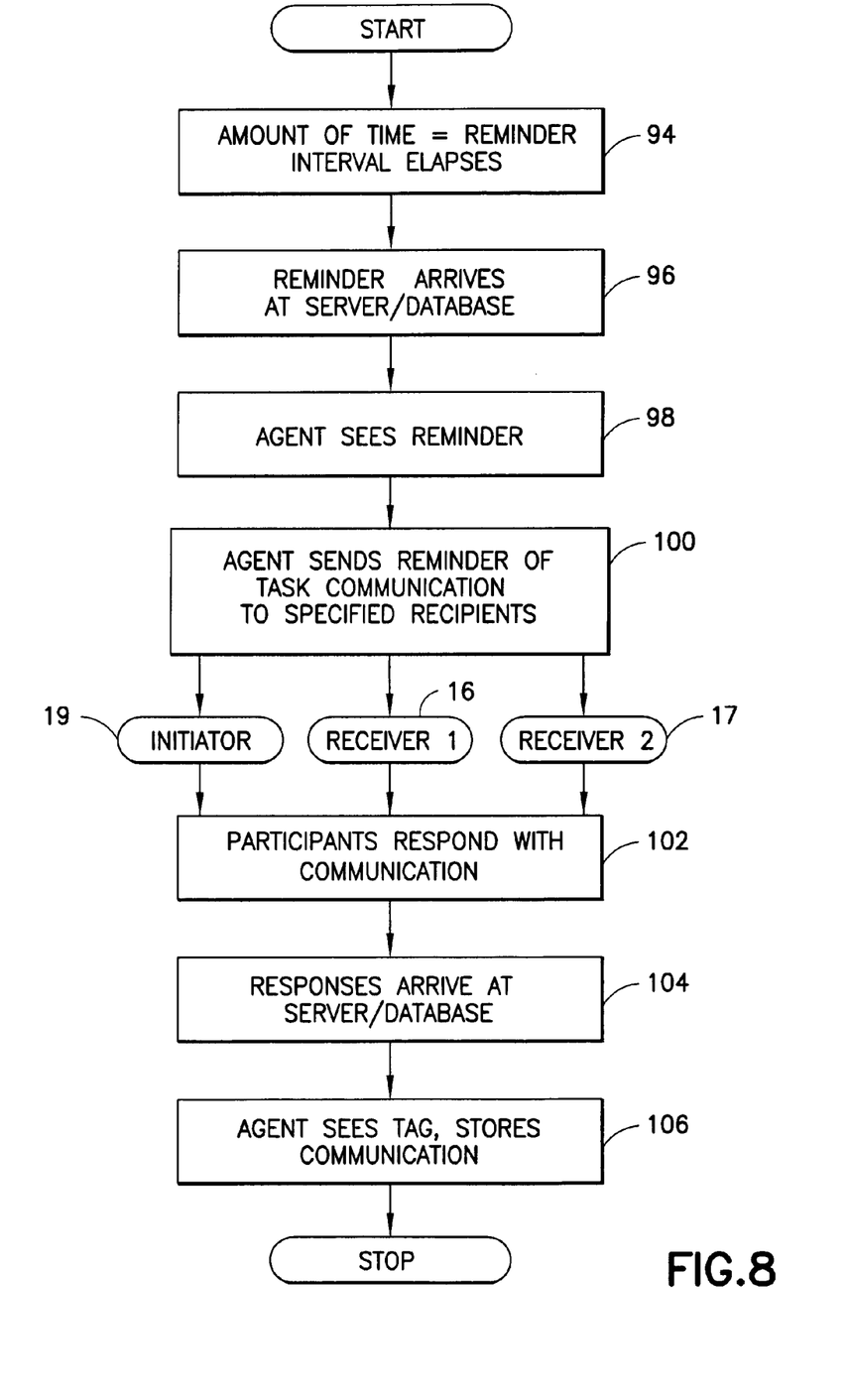
FIG. 8 is a flow chart of another feature of the present invention.

The present invention can provide a mechanism for proactively reminding users about impending tasks. FIG. 8 illustrates this process. At task initiation time (i.e., when the Initiator's communication is sent as shown in FIG. 2), a reminder interval was set. This reminder interval can be used to send a reminder when the task is supposed to be complete. Reminder intervals can be stored as the date and time on which they are due. If the Initiator specifies a week from now, that gets translated into the current day and time plus seven days, and gets stored as the date and time on which the reminder needs to be sent. If it is a one time reminder it is simply stored. If it is a recurring reminder it can be stored with an indication of how many more reminders need to be sent (and then when it comes due the above calculation is re-performed and the task is stored again). The task can be stored by the agent on the server associated with the receiver (the user who is to be reminded). The agent can track all upcoming reminders (which can be specified by date, or by date and time). The agent can be run periodically (for example, via a cron job) and whenever new communication arrives at the server of the receiver.

When the agent 80 runs, the agent examines the list of upcoming reminders and determines if any of them need to be sent (i.e., the current time is greater than or equal to that on the reminder). The agent can send out the reminder to whomever the Initiator indicated. When the reminder interval elapses as indicated by block 94, a reminder will arrive at the server/database as indicated by block 96. The agent 80 sees the reminder as indicated by block 98 and sends a reminder, such as an email, as indicated by block 100. In the example in FIG. 8, this is Receiver 1, Receiver 2, and the Initiator. Participants can respond to this reminder as indicated by block 102 with update communications as described above, and both the reminder and successive responses can arrive at the server/database as indicated by block 104 where the agent sees the tag and its properties, and stores the communication or at least the portions of the tag as indicated by block 106.

Figure 9:
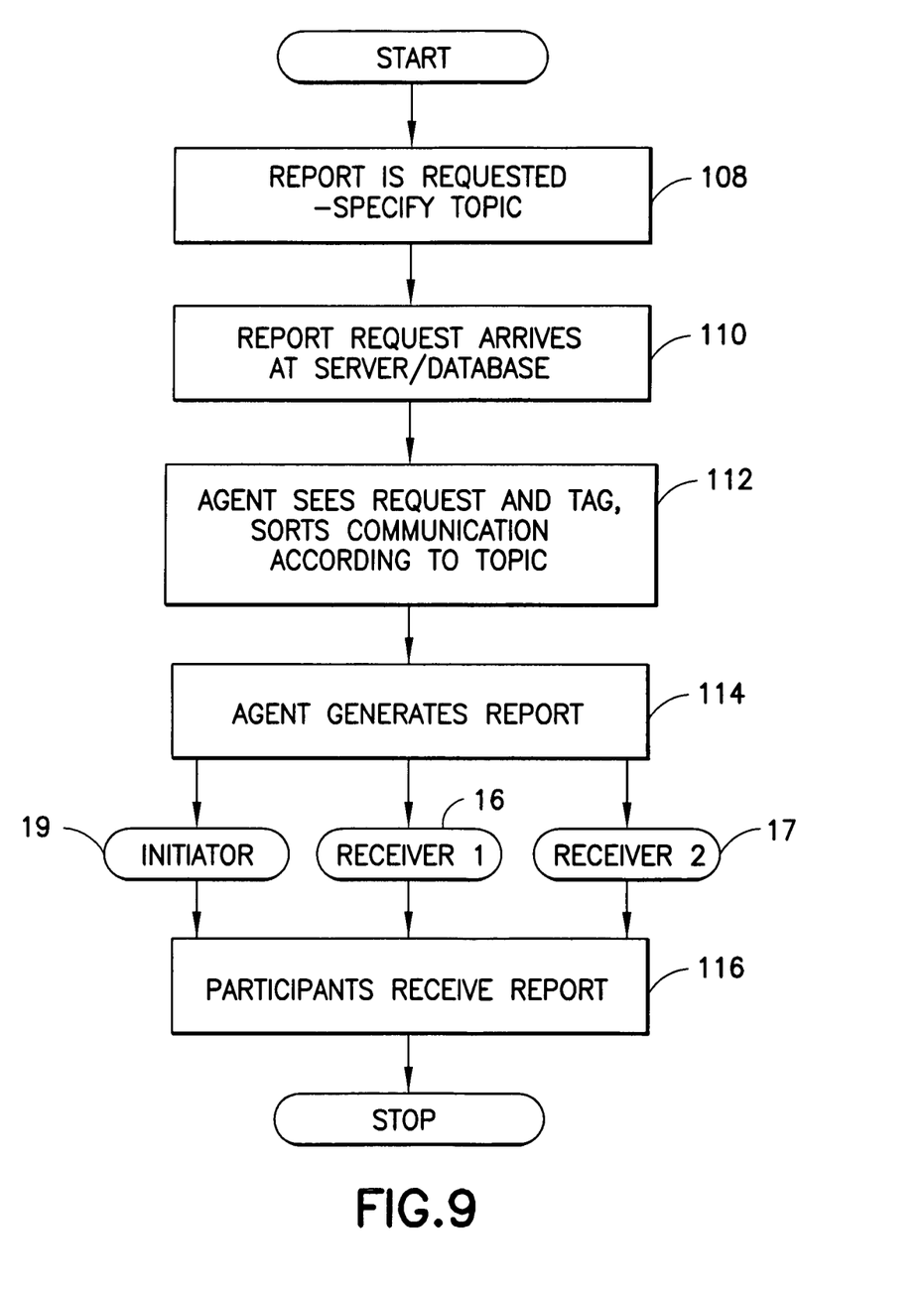
FIG. 9 is a flow chart of a reporting feature of the present invention.

A method for report generation will now be described with reference to FIG. 9. Reports could be generated by deliverables or projects, by task topics, by a person responsible for a task topic, or any other suitable type of criteria contained in the communication or email tag, or in email fields. When a user requests a report as indicated by block 108, the report request arrives at the server/database as indicated by block 110. The report request would need to specify one or more task topics. The agent sees the request and tag, and sorts communications according to task topic as indicated by block 112. The agent can then generate the report as indicated by block 114 and send it to the participants who receive the report as indicated by block 116.

The agent 80 on the requesting server can take several actions. The agent 80 can first determine all the users that have received information pertinent to report task. It can do this by maintaining a list of all users that have received communications regarding the task. This list can be created at initiation time and modified on each update communication. When a report is requested, the agent 80 on the requesting server can send out messages to agents 80 on each server containing users on the list of those who have received communication about this task. As an optimization, a request to an agent 80 for users on the same server may be collapsed into a single message. The receiving agent can respond by sending all stored communications about the request task topic back to the requesting agent. Each communication that is sent out can be tagged with a unique identifier. The unique identifier can be a tuple that contains the unique identification of the server concatenated with a unique identifier for a specific communication. In this manner, duplicate messages to multiple receivers may be reduced to the single unique instance.

There can be several options available when generating a report. The report requester can specify the report to contain any of the following, for example,:

communications about a specific project or deliverable;
communications about a specific task, such as sorted by user, date, etc.,
only the final status of the task, or
any other relevant significant criteria, such all the reassignments or all the constraints.

The agent does not need to include in the report communications for which the requester did not have the proper access credentials. Depending on the mode of operation, the information can be either just omitted, or a message indicating additional information was unavailable is placed in the report instead of the information. After the report has been generated, it can be sent to the requester of the report as well as any other recipients specified by the requester. A report generation event is added to a log of all tasks associated with the report.

An option for the task participants is to specify the seniority of the participants. For example, a project may decide that although all project participants are able to post communications, only project managers are able to request reports.

The invention also allows for the merging of one or more project tasks. For example, if at some point during the project the project participants decide to merge one or more tasks, the agent can merge appropriate communications of these multiple task topics. The method by which this is accomplished can be as follows: The Initiator opens a task and sets 'task progress' to 'merge'. A pull-down menu can then appear and the Initiator can select the tasks that are to be merged into this task. The database agent can then merge all information associated with this list of tasks in the location of the task chosen by the Initiator.

The invention also allows for the division of a project task into two or more tasks. For example, if at some point during the project the project participants decide to separate one task into two or more tasks, the agent can separate the task and new task topics appropriately. The method by which this is accomplished can be as follows: The Initiator opens a task and sets 'task progress' to 'separate'. A window can appear in which the Initiator can enter the names of the new tasks that follow from this existing task. All recipients can be informed by the database agent of the existence of the new separate tasks.

The invention also allows for the addition of additional project participants and for the removal of project participants as necessary. The invention also allows for permissions to be associated with tasks. For example, some users may not be allowed to see the communication of all other users. Examples of applications of this invention are now described.

EXAMPLE 1

At periodic intervals, individuals take on tasks as part of their job responsibilities. These tasks frequently appear via electronic communication with other individuals, managers, or remote collaborators. Currently, one needs to obtain this information by manually recording, tracking progress, remembering to follow-up and evaluate, and summarizing the tasks, and consequently this information is available only to the one who performed this manual work. With the present invention, simply checking the tag on a communication button will allow these tasks to be performed in an automated fashion; moreover the results are able to be accessed by any of the individuals, managers, and collaborators who are participating in the tasks. An electronic communication can be initiated by an individual wishing to track progress on their own tasks for periodic, such as end-of-year, reporting. Furthermore, checking the tag on a communication button will cause the database agent to log, or register, the task, automatically ask for progress on aforesaid task, and at a specified negotiable time can create a report of all such tasks. The invention provides information that previously could only be obtained with a great deal of manual effort. With the present invention this gathering or information streamlines and simplifies the employee's responsibility, provides a method to ensure that project managers' expectations and employees' expectations are in agreement during the duration of a task, and also yields more accurate reports.

EXAMPLE 2

A team leader can tag communications that are sent to team members as part of the project. As in the previous example, the database agent will record the communications, and will automatically ask members for progress and evaluation of the task. Therefore the team leader will be able to ask for a status report on tasks in this project at any time.

EXAMPLE 3

A project manager can tag communications when tasks are assigned to employees. This invention allows an importance factor to be assigned to said task, and. managers can take advantage of this mechanism to prioritize tasks and, thus, create a prioritized list of tasks that specifies the order in which employees will accomplish the tasks. More senior managers may be allowed to assign greater importance values. As with the team leader example, a manager can generate a task status report.

EXAMPLE 4

Consider a project in which a team is working toward a goal to increase the chip yield at a fabrication plant. As in the example above, a manager may assign global tasks that need to be accomplished for the next experiment in increasing the yield. These global tasks may, in turn, be assigned to team leaders who delegate individual tasks to employees, where the individual tasks attack individual pieces of the global task. Employees can use the agent to track tasks that they have to accomplish. Moreover, the invention allows the tagged communications to be processed by a remote system, which in this case is one or more computers and associated storage capability that are tracking the yield on the fabrication line. Tagged communications can be created by each employee when the employee accomplishes a task to identify how their successful task completion has affected the overall yield at the plant. Similarly, after each phase of the project, as defined at the outset by the manager and possibly renegotiated periodically, the database agent could automatically send a tagged communication to the computers tracking yield at the fabrication plant, receive a response, and summarize that result in conjunction with a list of tasks that have been accomplished by the employees.

The present invention provides a mechanism to allow participants in a project to tag their communications. This allows a database to automatically perform any of the following:
    track task activation,
    generate reports,
    track tasks evaluation,
    track negotiation of task deliverables and deadlines,
    allow merging of one or more tasks into a single task,
    allow dividing of one task into two or more separate tasks,
    be proactive by monitoring task deadlines and reminding task participants of upcoming obligations.

This invention can be used to obtain project status reports on demand without the need to contact project participants individually, which otherwise would be a time-consuming and tedious process. This invention offers the ability to manage projects more effectively by automating manual efforts allowing project workers to focus more time on completing tasks.

What is claimed is:

1. A method for automatically tracking progress of a task on a computer network consisting of one or more users on a plurality of computer systems, the method comprising:
    tagging a communication to be delivered between the computer systems over the network to form a tagged communication; and
    acting on the tagged communication automatically by a database agent of an apparatus
    where the tagged communication includes a telephone message converted to electronic communication with the use of voice-recognition software.

\* \* \* \* \*